US012133318B2

(12) United States Patent
Bykanov et al.

(10) Patent No.: US 12,133,318 B2
(45) Date of Patent: Oct. 29, 2024

(54) ROTATING TARGET FOR EXTREME ULTRAVIOLET SOURCE WITH LIQUID METAL

(71) Applicant: KLA Corporation, Milpitas, CA (US)

(72) Inventors: Alexander Bykanov, Escondido, CA (US); Rui-Fang Shi, Cupertino, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/091,994

(22) Filed: Dec. 30, 2022

(65) Prior Publication Data

US 2023/0403778 A1 Dec. 14, 2023

Related U.S. Application Data

(60) Provisional application No. 63/350,868, filed on Jun. 10, 2022.

(51) Int. Cl.
*H05G 2/00* (2006.01)

(52) U.S. Cl.
CPC ............ *H05G 2/005* (2013.01); *H05G 2/008* (2013.01)

(58) Field of Classification Search
CPC .............................. H05G 2/005; H05G 2/008
USPC .................................................... 250/504 R
See application file for complete search history.

(56) References Cited

U.S. PATENT DOCUMENTS 5,504,770 A 4/1996 Taylor et al.
6,389,100 B1 5/2002 Verman et al.
10,481,111 B2 11/2019 Hench et al.
10,588,210 B1 3/2020 Vinokhodov et al.
10,638,588 B2 4/2020 Vinokhodov et al.
10,887,973 B2 1/2021 Ivanov et al.
11,073,487 B2 7/2021 Bykanov et al.
2007/0230531 A1 10/2007 Hergenhan et al.
2008/0137810 A1 6/2008 Liu et al.
2011/0101863 A1* 5/2011 Komori ................. H05G 2/005 315/111.41
2018/0206318 A1 7/2018 Deciccio et al.
2019/0115184 A1 4/2019 Zalubovsky
2020/0060014 A1 2/2020 Vinokhodov et al.

FOREIGN PATENT DOCUMENTS

DE 102013005845 B3 4/2014

OTHER PUBLICATIONS

WIPO, International Search Report for International Application No. PCT/US2023/023789, Sep. 20, 2023.
Grap et al., "Buried Multi-Gate InAs-Nanowire FETs," IEEE, 2017, pp. 82-85.

(Continued)

*Primary Examiner* — Kiet T Nguyen
(74) *Attorney, Agent, or Firm* — Hodgson Russ LLP

(57) ABSTRACT

An extreme ultraviolet (EUV) light source includes a vacuum chamber with a rotating target assembly therein. The rotating target assembly has an annular groove with a distal wall relative to an axis of rotation. The distal wall includes a porous region. The rotating target assembly is rotated to form a target by centrifugal force with a layer of molten metal on a distal wall of an annular groove in the rotating target assembly.

21 Claims, 6 Drawing Sheets

(56) References Cited

OTHER PUBLICATIONS

Fan et al., "The Absolute Calibration of a Small-Angle Scattering Instrument with a Laboratory X-ray Source," Journal of Physics: Conference Series 247, 2010.

Yashchuk et al., "Binary pseudo-random patterned structures for modulation transfer function calibration and resolution characterization of a full-field transmission soft x-ray microscope," Review of Scientific Instruments, Dec. 1, 2015, vol. 86, No. 12.

Huang et al., "X-ray Powder Diffraction Analysis of Silver Behenate, a Possible Low-Angle Diffraction Standard," Journal of Applied Crystallography, 1993, pp. 180-184, vol. 26.

* cited by examiner

ROTATING TARGET FOR EXTREME ULTRAVIOLET SOURCE WITH LIQUID METAL

CROSS-REFERENCE TO RELATED APPLICATIONS

This application claims priority to the provisional patent application filed Jun. 10, 2022 and assigned U.S. App. No. 63/350,868, the disclosure of which is hereby incorporated by reference.

FIELD OF THE DISCLOSURE

This disclosure relates to an extreme ultraviolet light source.

BACKGROUND OF THE DISCLOSURE

Next generation projection lithography for large-scale production of integrated circuits (IC) with structure sizes of 10 nm or less uses extreme ultraviolet (EUV) radiation in the range of 13.5+/−0.135 nm, which corresponds to effective reflection of multilayer Mo/Si mirrors. Controlling the IC to be defect-free is an important part of metrology processes. The general trend in lithographic production is a shift from IC inspection, which is time-consuming and costly in large-scale production, to the analysis of lithographic masks. Mask defects are projected onto a silicon substrate with a photoresist, resulting in the appearance of defects on the printed chips. The mask in EUV lithography is a Mo/Si mirror, on top of which a topological pattern is applied from a material that absorbs radiation at a wavelength of 13.5 nm. The most efficient method for the process of mask inspection is carried out at the same wavelength for actinic radiation, which is radiation whose wavelength coincides with the working wavelength of the lithography. Such scanning by radiation with a wavelength of 13.5 nm allows the detection of defects with a resolution better than 10 nm. Having defect-free lithographic masks during their production and during the entire period of operation is a challenge for EUV lithography. Creation of a device for the diagnosis of lithographic masks and its high-brightness actinic source is a priority for the development of EUV lithography.

In one design, a rotating target with liquid tin or other metals with fairly low melting temperature, such as In, Pb, Ga, Cd, Bi, or Li, or a combination thereof, can be distributed over the inner wall of rotating drum. This rotating target can be used as an EUV source. The interaction of a laser pulse with the liquid metal surface generates surface waves for each laser pulse. The waves will interfere with each other due to high rotation speed of the drum (e.g., above 1000 RPM) and high repetition rate of the laser generating plasma (e.g., above 10 kHz).

The surface waves create instability of liquid metal surface position relative to the focal spot of drive laser. This results in variation of laser beam dimensions at the point of interaction with the target and, hence, variation of laser beam intensity. This will result in variation of in-band conversion efficiency defined by deviation of actual laser intensity from the optimal laser intensity and will cause variation of EUV energy from pulse to pulse. Brightness of the source is defined by the ratio of EUV energy to the radiative surface area, which will vary due to small depth of focus of the focusing lens (Rayleigh length).

Estimations show that the wave velocity is slower than the drum linear velocity. Thus, the waves generated by single pulse cannot make a perturbation of the surface for the next laser pulse. A high rotating speed (e.g., up to 200 Hz) provides only 5 ms of wave propagation until the drum makes the full turn. The wave will make surface perturbation after this turn. Waves from multiple pulses may interfere with each other and may create high amplitude waves, which can cause EUV energy and brightness instabilities.

The rotating drum has a distal wall (from the rotation axis) and may have a proximal wall. The distal wall is coated with liquid metal. The proximal wall reduces liquid metal splashing or/and evaporation by the laser pulse in the vacuum chamber. Evaporated liquid metal can deposit on surfaces and cause problems for the source operation. The thickness of the liquid metal in the zone of interaction may be several millimeters (e.g., 2-3 mm). Reduction of the thickness below minimum value may result in increased splashing of the liquid metal by laser pulse. This is defined by propagation of shock waves in the liquid metal. In contrast, the thickness may need to be reduced to increase the influence of friction forces and viscosity, which will result in damping of the amplitude of the propagating waves.

Therefore, improved systems and methods are needed.

BRIEF SUMMARY OF THE DISCLOSURE

A system is provided in a first embodiment. The system includes a vacuum chamber and a rotating target assembly having an annular groove with a distal wall relative to an axis of rotation. The rotating target is disposed in the vacuum chamber. The distal wall includes a porous region.

The rotating target assembly can include a proximal wall opposite the distal wall to form the annular groove.

The system can include a rotation system coupled with the rotating target assembly. The rotation system can be configured to rotate the rotating target assembly around the axis of rotation.

The vacuum chamber can include an input window and an output window or an input window and optics. The proximal wall of the annular groove can be configured to provide a line of sight between the distal wall and the input window and the output window or the optics during laser pulses.

The system can include a laser source configured to direct a laser beam at the distal wall.

The system can include a molten metal disposed inside the annular groove. The molten metal can be disposed on the porous region.

The porous region can have pores that are less than 1 mm in diameter.

The porous region can have a thickness from 1-5 mm extending into the annular groove from the distal wall.

The porous region can be fabricated of titanium, stainless steel, aluminum, or molybdenum.

The porous region can have a varying depth across the distal wall.

A method is provided in a second embodiment. The method includes rotating a rotating target assembly in a vacuum chamber thereby forming a target by centrifugal force as a layer of molten metal is disposed on a distal wall of an annular groove in the rotating target assembly. The distal wall includes a porous region. A pulsed laser beam is directed through an input window of the vacuum chamber. The target on the distal wall is irradiated with the pulsed laser beam. A generated short-wavelength radiation beam is directed from the target.

The proximal wall of the annular groove can be configured to provide a line of sight between the distal wall and both the input window and an output window or both the input window and optics during the directing.

The molten metal can be disposed on the porous region.

The porous region can have pores that are less than 1 mm in diameter.

The porous region can have a thickness from 1-5 mm extending into the annular groove.

The porous region can be fabricated of titanium, stainless steel, aluminum, or molybdenum.

The porous region can be disposed under a surface of the target during the rotating.

The layer of molten metal can have a depth larger than a height of the porous region in a direction perpendicular to an axis of rotation of the rotating target assembly during the rotating.

The short-wavelength radiation beam can be directed through an output window of the vacuum chamber or through optics in the vacuum chamber.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

The invention disclosure describes the design of a laser produced plasma (LPP) target for an EUV source with liquid metal (e.g., tin) covering the inner side of rotating drum. The embodiments disclosed herein provide a reduction of waves generated on the target surface, which improves the EUV performance stability (i.e., pulse-to-pulse EUV in band brightness and energy). The disclosed design can damp the waves and provide a smooth surface for interaction of the target with a focused laser after at least one whole turn.

Figure 1:
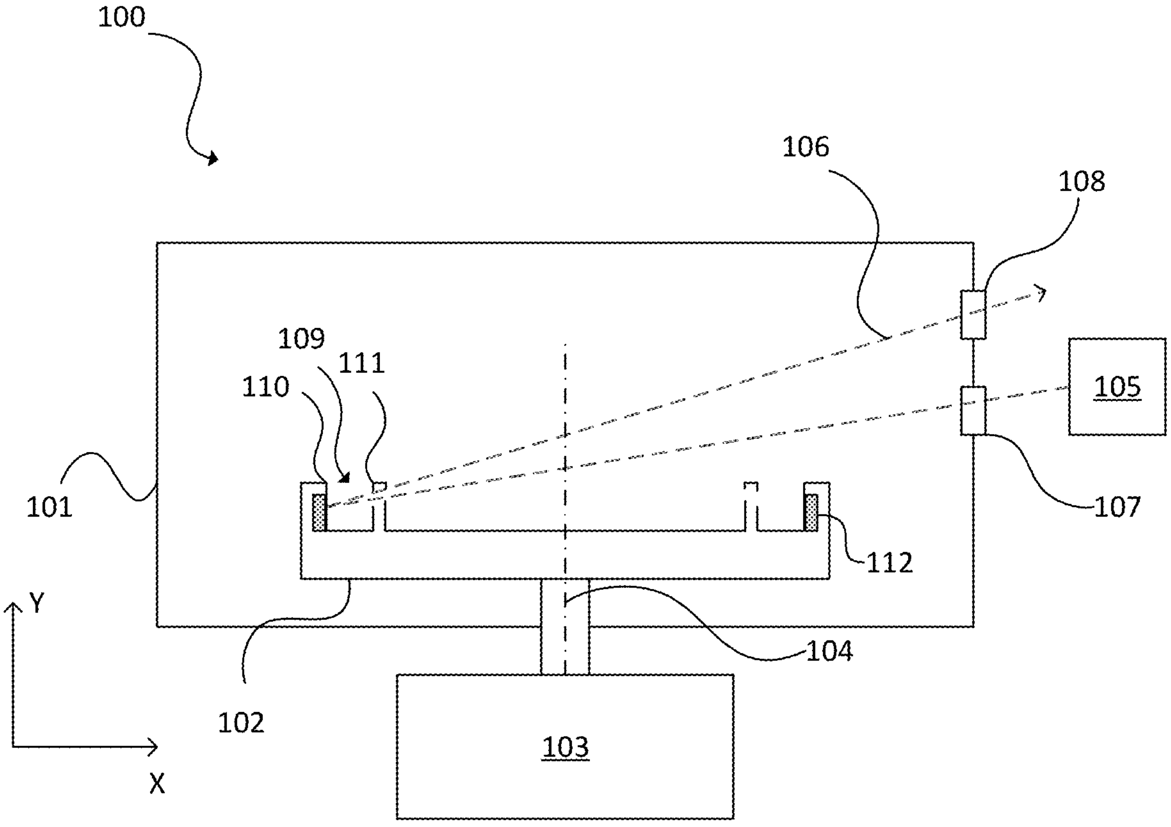
FIG. 1 is a cross-sectional view of a system embodiment in accordance with the present disclosure.

FIG. 1 is a cross-sectional view of a system 100. The system includes a vacuum chamber 101 with a rotating target assembly 102 in the vacuum chamber 101. The rotating target assembly 102 has an annular groove 109 with a distal wall 110 and a proximal wall 111 relative to the axis of rotation 104. The distal wall 110 includes a porous region 112. The porous region 112 can have a thickness from 1-5 mm extending into the annular groove 109 from a surface of the distal wall 110 (i.e., in the X-direction perpendicular to the axis of rotation 104). The rotating target assembly 102 can be fabricated of aluminum, titanium, alloys thereof, or other materials.

Depending on the design of the rotating target assembly 102, the proximal wall 111 can rotate or can be stationary. In an embodiment, a proximal wall 111 is not included and the rotating target assembly 102 only includes a distal wall 110. If no proximal wall 111 is included, the annular groove 109 can be measured relative to a component in the center of the rotating target assembly 102 or may instead be a circular groove.

A rotation system 103 is coupled with the rotating target assembly 102. The rotation system 103 rotates the rotating target assembly 102 around the axis of rotation 104. The rotation system 103 can use a shaft to transmit the rotation to the rotating target assembly 102. The rotation system 103 can be an electromotor or other mechanism.

The vacuum chamber 101 can include an input window 107 and output window 108. The proximal wall 111 of the annular groove 109 can be configured to provide a line of sight between the distal wall 110 and the input window 107 and the output window 108 during laser pulses. A laser source 105 is configured to direct a laser beam 106 at the distal wall 110. The liquid metal on the distal wall 110 is a target for the laser beam 106.

While illustrated with an output window 108 in FIG. 1, the system 100 also can include optical elements in the vacuum chamber 101 to collect EUV radiation. With this design, the output window 108 may not be present.

A molten metal (shown in other figures) is disposed inside the annular groove 109. The liquid metal can be tin, another metal with low melting temperature, or an alloy with low melting temperature. Besides Sn, the other metals can include In, Pb, Ga, Cd, Bi, Li, or a combination thereof. In an instance, the molten metal is disposed on the porous region 112, such as in the pores and on a surface of the porous region 112. The molten metal can pool on the distal wall 110 when the rotating target assembly 102 is rotated around the axis of rotation 104. This can prevent a direct impact of the porous region 112 by the laser beam 106.

The porous region 112 can be sponge-type or sintered metal insert. The porous region 112 also can be formed directly in or on the surface of the rotating target assembly 102. The porous region 112 can extend around an entire circumference of the rotating target assembly 102 or part of the circumference of the rotating target assembly 102. A height of the porous region 112 (in the Y-direction) can extend entirely from the base of the annular groove 109 to a top of the molten metal or top of the distal wall 110. A height of the porous region 112 also can extend less than an entirety the base of the annular groove 109 to a top of the molten metal or top of the distal wall 110. A thickness of the porous region 112 (in the X-direction) can be uniform or variable across the surface of the annular groove 109.

The porous region 112 can have pores that are less than 1 mm in diameter. The porous region 112 can be fabricated of titanium, stainless steel, molybdenum, aluminum, or other metals or metal alloys. The thickness of a layer of the molten metal in the annular groove 109 during rotation (i.e., in the X-direction) may be minimal, but can be configured to be thick enough so the porous region 112 is not impacted by the laser beam 109. This can help keep the porous region 112 intact. This thickness of the molten metal can be chosen experimentally and can be from 0.5-1 mm corresponding to the depth of laser crater. The interaction of a laser pulse (or shock wave generated by the pulse) with the liquid metal impregnating the porous region 112 may not cause splashing because of the effective thickness. A smaller thickness of the liquid metal and higher roughness of the porous region 112 can help damp the waves generated by the laser pulses.

Besides preventing splashing, the porous region 112 can serve as a reservoir of the liquid metal as the liquid metal is ablated using the laser beam 106. Liquid metal can be stored in the pores of the porous region 112.

The rotating target assembly 102 can be disc-shaped. However, rotating target assembly 102 can have the shape of a wheel, a low polyhedral prism, or another shape.

The embodiments disclosed herein use a liquid-phase target, which helps ensure the reproducibility of the target surface in contrast to a solid-phase target. This increases the pulse-to-pulse stability of the output characteristics of the short-wavelength radiation source. Long-term stability of the short-wavelength radiation source can be achieved due to continuous circulation, renewal, and replenishment of the liquid metal. The use of laser-produced plasma of metals (e.g., tin) can ensure both high brightness and high efficiency of the short-wavelength radiation source. This can apply at the working wavelength, 13.5 nm, of the EUV lithography. The rotating target assembly 102 can limit the outflow of debris particles beyond it, which can improve the cleanliness of the short-wavelength radiation source and minimize consumption of the target material.

The laser source 105 may generate short (e.g., 100 ns or less) laser pulses. In an embodiment, the laser can have a wavelength from 1 μm to 10 μm. A synchronization system can be used with the laser source 105 to irradiate the surface of the rotating target assembly 102 with line of sight. A photodetector can detect a reflected continuous signal of the auxiliary laser radiation, modulated by the markers and starts the main pulsed laser at the rotation angles of the annular groove 109, which provide a line of visibility between the interaction zone and the input and output windows 107, 108 through the proximal wall 111.

In an instance, microdroplets of the target material, passing into apertures of the proximal wall 111 may be ejected back into the annular groove 109 under the action of a centrifugal force. Thus, the plasma-forming material of the target may not leave the annular groove 109, increasing the source lifetime without the need for refilling.

Figure 2:
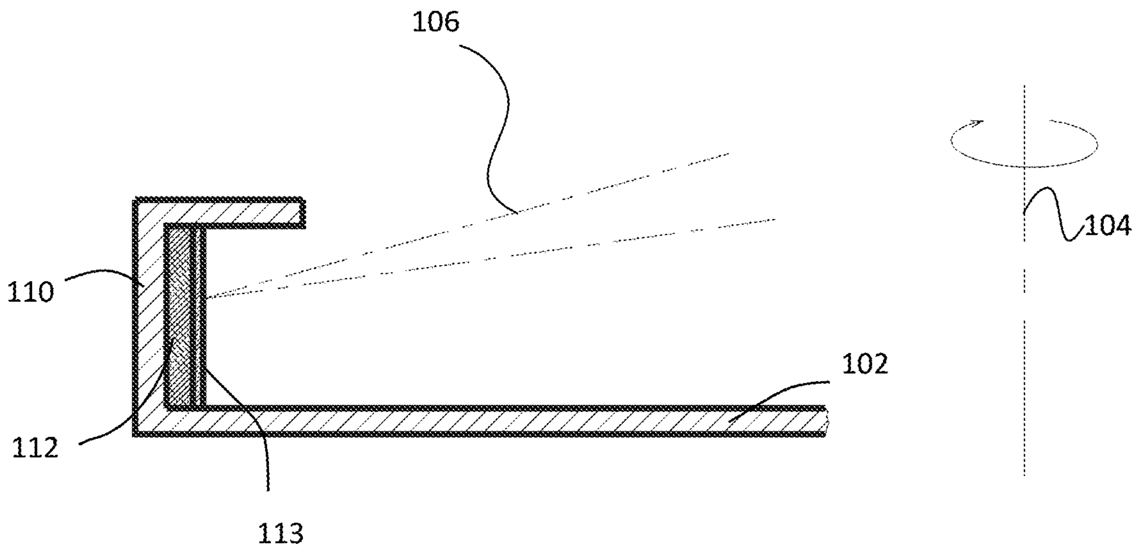
FIG. 2 is a cross-sectional view of an embodiment of part of the rotating target assembly.

FIG. 2 is a cross-sectional view of an embodiment of part of the rotating target assembly 102. This embodiment does not include the proximal wall 111. The porous region 112 is a porous material (e.g., sponge or sintered) impregnated with liquid metal 113. The thickness of liquid metal 113 relative to the distal wall 110 (i.e., the volume of the liquid metal 113) can be reduced compared to a design without the porous region 112. The liquid metal 113 is held on the distal wall 110 using centrifugal force during rotation of the rotating target assembly 102.

Figure 3:
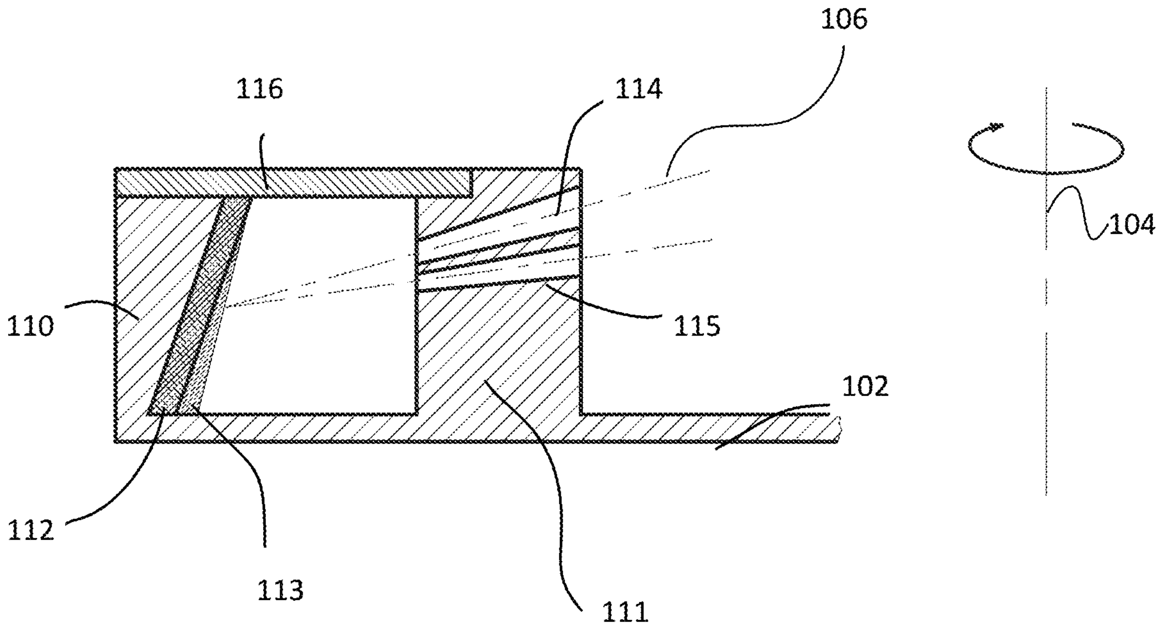
FIG. 3 is a cross-sectional view of another embodiment of part of the rotating target assembly.

FIG. 3 is a cross-sectional view of another embodiment of part of the rotating target assembly 102. The proximal wall 111 is illustrated with an input aperture 115 and an output aperture 114 for the laser beam 106. There also is a cover 116 between the distal wall 110 and the proximal wall 111. The cover 116 can help keep droplets of the liquid metal 113 contained in the desired area. In the embodiment of FIG. 3, the distal wall 110 is tilted relative to the proximal wall 111. Thus, the distal wall 110 does not meet the base of the rotating target assembly 102 at a perpendicular angle.

In an instance, waves can propagate through the liquid metal 113 and reflect off a solid surface, which can cause splashing. Wave propagation in the liquid metal 113 is reduced with the porous region 112. The porous region 112 also can prevent splashing or an uneven surface of the liquid metal 113. Splashing can generate microdroplets around the EUV and laser tunnels and may gradually clog them. A more even distribution of the liquid metal 113 (i.e., an even surface) can reduce vibrations in the rotating target assembly 102. A uniform distribution will reduce vibrations of the rotating target assembly 102 and can provide a stable position of the target surface relative to laser focal spot, which can improve EUV stability.

In the embodiments disclosed herein, the velocity of the surface waves generated by interaction of laser pulse of the laser beam 106 with the liquid metal 113 can be estimated from the Korteweg-De-Vries equation describing waves on shallow water under the gravity field. For a long wavelength the solution will give the propagation velocity: $c=\sqrt{gh}$. In the case of a rotating target assembly 102, the free fall acceleration for the centrifugal acceleration V^2/R is replaced. Here, V is linear velocity of the drum surface with radius of R. Then the speed of surface waves will be equal to $c=V\sqrt{(h/R)}$. When $h \ll R$, then $c \ll V$ and the center of the wave generated by the laser pulse will be moved out from the focal zone with the speed of V, while generated waves will propagate more slowly. For example, if V=100 m/s, R=80 mm and h=2 mm, then c=16 m/s. However, when the rotating target assembly 102 makes the whole turn (e.g., 5 milliseconds time at 12,000 rpm), the wave may be hit by laser unless it did not calm down. The amplitude of the wave may start from fraction of millimeter range (e.g., 0.05-0.2 mm) and may remain the same or even magnified similar to tsunami unless it is damped by the porous region 112.

Figure 4:
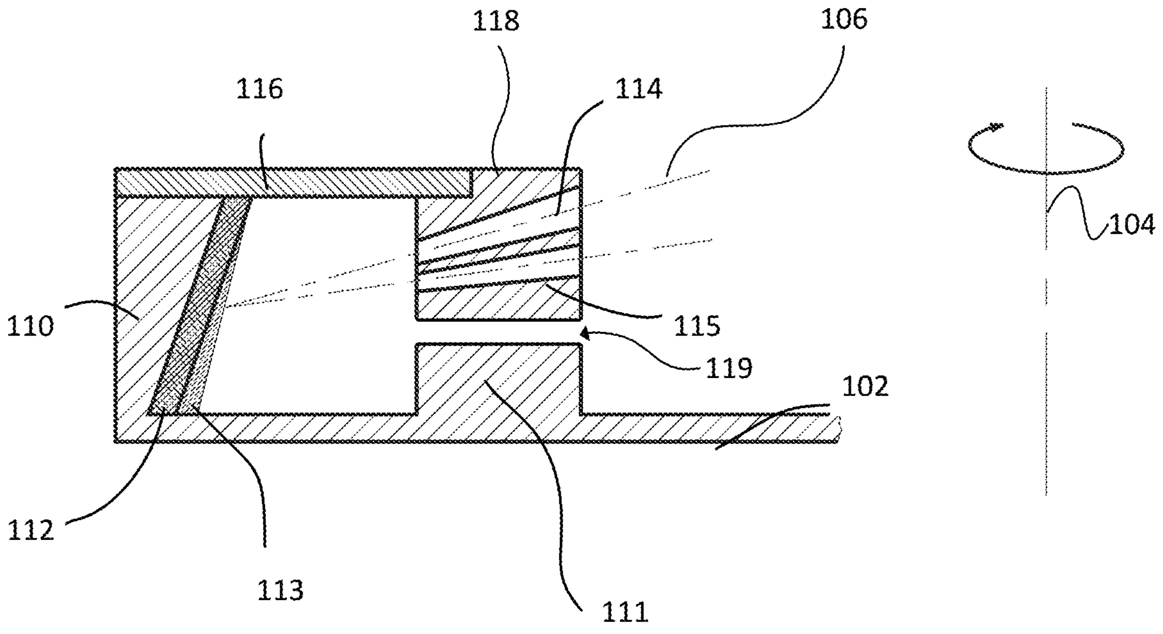
FIG. 4 is a cross-sectional view of another embodiment of part of the rotating target assembly.

FIG. 4 is a cross-sectional view of another embodiment of part of the rotating target assembly 102. A stationary shield 118 is used in the irradiation zone, which can serve as a part of or an entirety of a proximal wall 111. There is a gap 119 between the rotating target assembly 102 and the stationary shield 118. The input aperture 115 and output aperture 114 can be drilled through the stationary shield 118 and can be aligned to the laser beam and EUV optics. In an instance, the input aperture 115 and output aperture 114 are conical. The stationary shield 118 can be separate from the rotating component of the target and synchronization may not be required between the stationary shield and cover 116 and/or between the stationary shield 118 and a base of the rotating target assembly 102.

Figure 5:
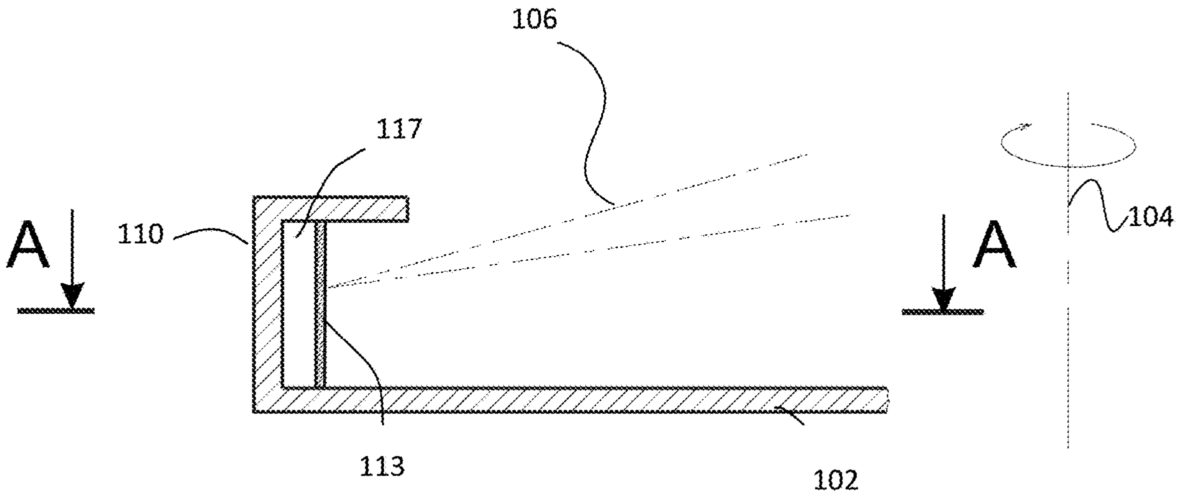
FIG. 5 is a cross-sectional view of another embodiment of part of the rotating target assembly.
Figure 6:
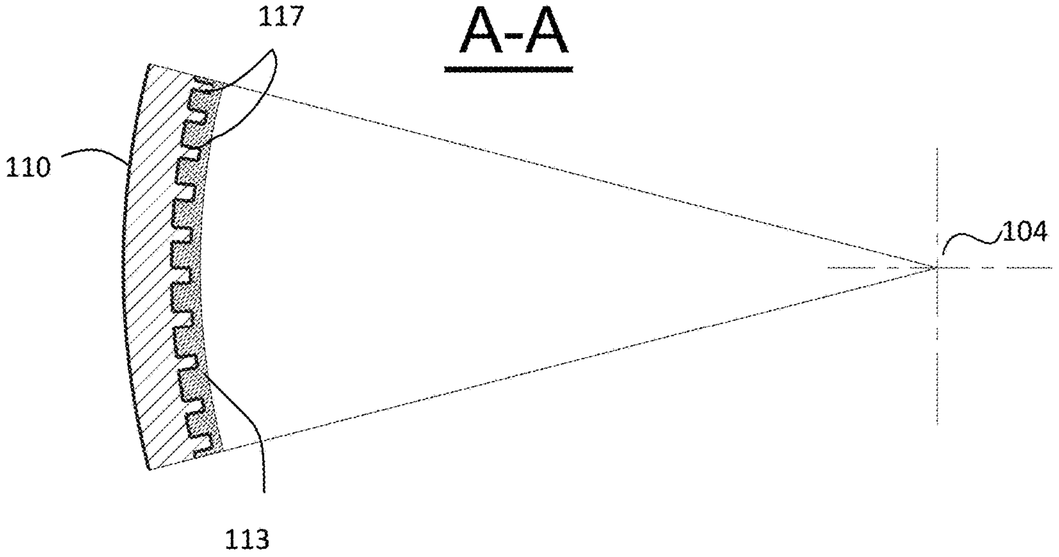
FIG. 6 is a top view of an embodiment of the rotating target assembly shown in FIG. 5 along A-A.

In an instance, the porous region 112 has a varying depth across the distal wall 110, which is shown in FIGS. 5 and 6 in an example. The waves may be damped using a rotating target assembly 102 with grooves. The segments 117 are shown extending from the distal wall 110 to form grooves. The grooves can have a depth that avoids a splashing interaction of the laser with the liquid metal 113. The segments 117 can create barriers with minimum a liquid metal 113 thickness above the segment 117. This barrier can attenuate and dampen the waves. The space between the groves can have small thickness of molten metal so the waves will go through the surface with variable depth. Shallow regions will slow the waves and reduce amplitude by viscosity.

The distribution uniformity of the liquid metal 113 can be provided by proper filling the rotating target assembly 102. The laser beam 106 can be synchronized with the groove positions using an encoder and external triggering.

The liquid metal 113 can fill the grooves and creating thin layer on top of the segments 117. The thickness of the liquid metal 113 on top of the segments 117 relative to the distal wall 110 may be as small as 0.1-0.2 mm, which can efficiently damp the surface waves. The porosity can create additional viscous friction.

In an embodiment, the segments 117 can be formed in the porous region 112. The porous material can provide an advantage in even thickness distribution for liquid metal 113 due to high rotation speed of the rotating target assembly 102.

The embodiments disclosed herein can damp the waves generated by the interaction of laser pulse with liquid metal surface. This can result to improvement of EUV stability on pulse-to-pulse base both for in-band energy and brightness. Thickness distribution of liquid metal can be made more even because of a reduction in instabilities related to vibrations and other disturbance sources. This also result in improvement of target surface position and stabilization of the source brightness.

Figure 7:
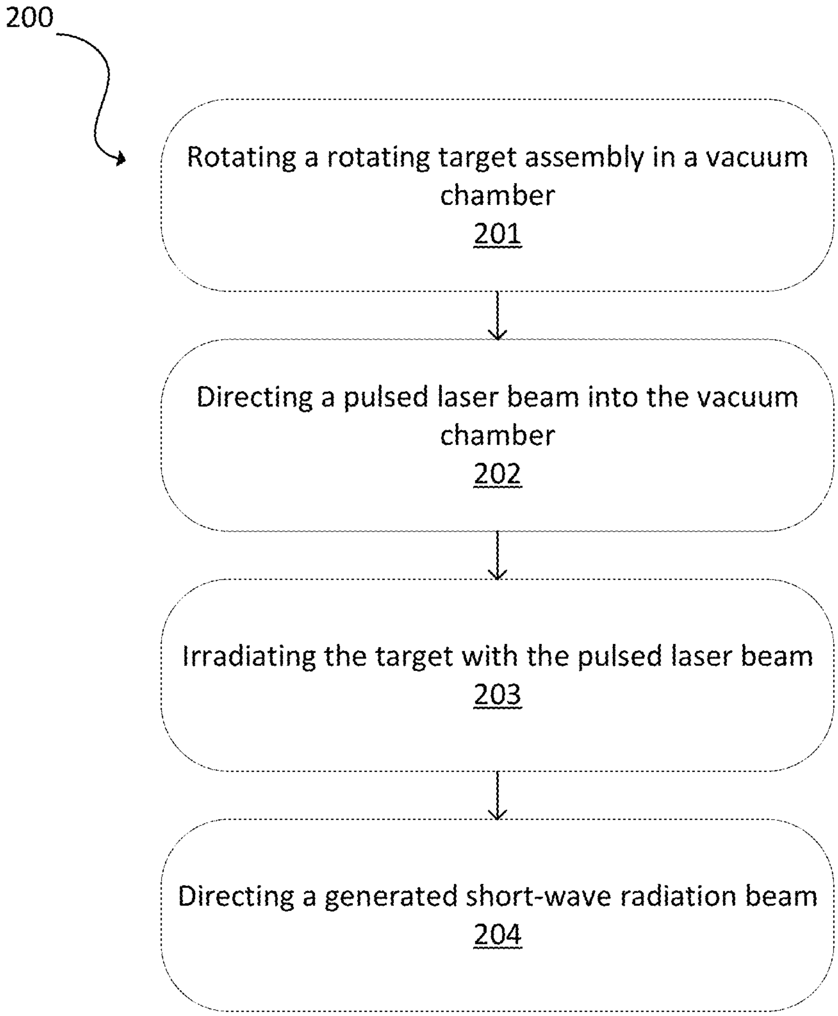
FIG. 7 is a flowchart of a method in accordance with the present disclosure.

FIG. 7 is a flowchart of a method 200. At 201, a rotating target assembly is rotated in a vacuum chamber thereby forming a target by centrifugal force as a layer of molten metal is disposed on a distal wall of an annular groove in the rotating target assembly. The distal wall includes a porous region. The molten metal can be disposed on and in the porous region. The porous region can have pores that are less than 1 mm in diameter and a thickness from 1-5 mm extending into the annular groove.

A pulsed laser beam is directed through an input window of the vacuum chamber at 202. The target (e.g., the liquid metal) on the distal wall is irradiated with the pulsed laser beam at 203. A generated short-wavelength radiation beam, which is caused by the irradiation, is directed through an output window of the vacuum chamber or optics in the vacuum chamber at 204. The proximal wall of the annular groove can be configured to provide a line of sight between the distal wall and both the input and output windows during the directing. The proximal wall may be arranged as a stationary shield and can include gaps with adjacent rotating components.

The porous region can be disposed under a surface of the target during the rotating. The layer of molten metal can have a depth larger than a height of the porous region in a direction perpendicular to an axis of rotation of the rotating target assembly during the rotating. Wave propagation is reduced and a more even distribution of liquid metal is produced.

To produce high-temperature laser-produced plasma with high optical output in short-wavelength spectra from ultraviolet to soft x-ray band, the density of power of laser radiation of the laser beam 106 on the target can be from $10^{10}$ to $10^{12}$ W/cm$^2$ and the length of laser pulses can be from 100 ns to 0.5 ps.

To generate the laser beam 106, any pulsed or modulated laser or several lasers may be used. The laser source 105 may be solid state, fiber, disk, or gas discharge. The average power of laser radiation in the laser beam 106 can be in the range from 10 W up to about 1 kW or more with focusing of the laser beam 106 on a small focus spot on a target, for example about 100 μm in diameter.

The laser pulse repetition frequency can be from 1 kHz to 10 MHz. In this range, a higher pulse repetition rate at lower output laser energy can reduce the splash of debris particles.

The vacuum chamber can be evacuated with an oil-free pump system to below $10^{-5}$ to $10^{-8}$ bar, which can remove gas components such as nitrogen and carbon that are capable of interacting with the target material.

The vacuum chamber can be filled up with buffer gas (e.g., Hz, He, or Ar) having high transmission for short wavelength radiation and to protect optics from debris generated by the plasma.

The liquid metal can be kept molten using an inductive heating system configured to permit temperature stabilization of liquid metal in order to keep it within the optimal temperature range.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:

a vacuum chamber; and a rotating target assembly having an annular groove with a distal wall relative to an axis of rotation, wherein the rotating target is disposed in the vacuum chamber, and wherein the distal wall includes a porous region.

2. The system of claim 1, wherein the rotating target assembly has a proximal wall opposite the distal wall to form the annular groove.

3. The system of claim 1, further comprising a rotation system coupled with the rotating target assembly, wherein the rotation system is configured to rotate the rotating target assembly around the axis of rotation.

4. The system of claim 1, wherein the vacuum chamber includes an input window and an output window or an input window and optics.

5. The system of claim 4, wherein a proximal wall of the annular groove is configured to provide a line of sight between the distal wall and both the input window and the output window or both the input window and the optics during laser pulses.

6. The system of claim 1, further comprising a laser source configured to direct a laser beam at the distal wall.

7. The system of claim 1, further comprising a molten metal disposed inside the annular groove.

8. The system of claim 7, wherein the molten metal is disposed on the porous region.

9. The system of claim 1, wherein the porous region has pores that are less than 1 mm in diameter.

10. The system of claim 1, wherein the porous region has a thickness from 1-5 mm extending into the annular groove from the distal wall.

11. The system of claim 1, wherein the porous region is fabricated of titanium, stainless steel, aluminum, or molybdenum.

12. The system of claim 1, wherein the porous region has a varying depth across the distal wall.

13. A method comprising:

rotating a rotating target assembly in a vacuum chamber thereby forming a target by centrifugal force as a layer of molten metal is disposed on a distal wall of an annular groove in the rotating target assembly, wherein the distal wall includes a porous region;

directing a pulsed laser beam through an input window of the vacuum chamber;

irradiating the target on the distal wall with the pulsed laser beam; and directing a generated short-wavelength radiation beam from the target.

14. The method of claim 13, wherein a proximal wall of the annular groove is configured to provide a line of sight between the distal wall and both the input window and an output window or both the input window and optics during the directing.

15. The method of claim 13, wherein the molten metal is disposed on the porous region.

16. The method of claim 13, wherein the porous region has pores that are less than 1 mm in diameter.

17. The method of claim 13, wherein the porous region has a thickness from 1-5 mm extending into the annular groove.

18. The method of claim 13, wherein the porous region is fabricated of titanium, stainless steel, aluminum, or molybdenum.

19. The method of claim 13, wherein the porous region is disposed under a surface of the target during the rotating.

20. The method of claim 13, wherein the layer of molten metal has a depth larger than a height of the porous region in a direction perpendicular to an axis of rotation of the rotating target assembly during the rotating.

21. The method of claim 13, wherein the short-wavelength radiation beam is directed through an output window of the vacuum chamber or through optics in the vacuum chamber.

* * * * *